US007061633B1

(12) United States Patent
Shima

(10) Patent No.: US 7,061,633 B1
(45) Date of Patent: Jun. 13, 2006

(54) PRINTER AND NETWORK PRINTING SYSTEM

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/487,728

(22) Filed: Jan. 19, 2000

(30) Foreign Application Priority Data

Jan. 20, 1999 (JP) .............................. 11-011612
Aug. 16, 1999 (JP) .............................. 11-230119

(51) Int. Cl.
G06F 15/00 (2006.01)
G06F 3/00 (2006.01)

(52) U.S. Cl. ..................... 358/1.15; 358/1.16; 358/1.9; 715/835; 715/839; 715/841

(58) Field of Classification Search ............... 358/1.15, 358/1.16, 1.13, 1.14, 1.2, 1.9; 400/61; 715/835, 715/839, 841
See application file for complete search history.

(56) References Cited

U.S. PATENT DOCUMENTS

| 5,323,393 | A | * | 6/1994 | Barrett et al. ............... 370/449 |
| 5,566,278 | A | * | 10/1996 | Patel et al. ................ 358/1.15 |
| 5,699,493 | A | * | 12/1997 | Davidson et al. .......... 358/1.15 |
| 5,819,015 | A | * | 10/1998 | Martin et al. .............. 358/1.15 |
| 5,873,659 | A | * | 2/1999 | Edwards et al. .............. 400/61 |
| 6,054,988 | A | * | 4/2000 | Alimpich et al. ........... 715/769 |
| 6,203,220 | B1 | * | 3/2001 | Takenoshita et al. .......... 400/61 |
| 6,292,267 | B1 | * | 9/2001 | Mori et al. ................ 358/1.15 |
| 6,335,746 | B1 | * | 1/2002 | Enokida et al. ............. 715/839 |
| 6,469,796 | B1 | * | 10/2002 | Leiman et al. ............. 358/1.15 |
| 6,549,302 | B1 | * | 4/2003 | Takeda et al. ............... 358/1.9 |
| 6,567,180 | B1 | * | 5/2003 | Kageyama et al. ......... 358/1.15 |

FOREIGN PATENT DOCUMENTS

| JP | 7-141132 | 6/1995 |
| JP | 9-34661 | 2/1997 |
| JP | 9-120346 | 5/1997 |
| JP | 9-179704 | 7/1997 |

OTHER PUBLICATIONS

Written opposition for Japanese Patent 3266146 with English translation, submitted by opponent dated on Sep. 18, 2002.
Notification of sending of duplicate of Written opposition for Japanese Patent No. 3266146, prepared on Oct. 25, 2002 and sent out Nov. 8, 2002 to patentee with English translation.
Fiery XJ+5000 Color server administrator guide (Copyright in 1997).
Fiery XJ+5000 Color server user guide (Copyright in 1997).

* cited by examiner

Primary Examiner—Edward Coles
Assistant Examiner—Chan S. Park
(74) Attorney, Agent, or Firm—Sughrue Mion, PLLC

(57) ABSTRACT

A computer for a user employs an FTP (File Transfer Protocol) to communicate with a printer. When print data are transmitted by the computer to the printer, a configuration file generator generates a configuration file based on print setup information received from the computer. A setup reference unit then employs the configuration file to generate a menu having a tree structure, and this menu is displayed on a user interface of the computer. The user confirms, by using a browser, the processing state of a print job and the print setup.

17 Claims, 10 Drawing Sheets

FIG. 2A

| PRINTER NAME | PRIORITY | PAPER DISCHARGE METHOD | ...... | DELETE DESIGNATION | PRINT DATA |
|---|---|---|---|---|---|
| 21A | 21B | 21C | | 21N | 22 |

FIG. 2B

| CONFIGURATION FILE | | |
|---|---|---|
| PRINT JOB J1 | PRINTER NAME | P2 |
| | PRIORITY | HIGHEST PRIORITY |
| | PAPER DISCHARGE METHOD | FACE DOWN |
| | PAPER SUPPLY METHOD | TRAY 1 |
| | ⋮ | ⋮ |
| | DELETE DESIGNATION | YES |
| PRINT JOB J2 | PRINTER NAME | P2 |
| | PRIORITY | NORMAL |
| | PAPER DISCHARGE METHOD | FACE UP |
| | PAPER SUPPLY METHOD | TRAY 2 |
| | ⋮ | ⋮ |
| | DELETE DESIGNATION | NO |
| PRINT JOB J3 | PRINTER NAME | P2 |
| | PRIORITY | LOW |
| | PAPER DISCHARGE METHOD | FACE UP |
| | PAPER SUPPLY METHOD | AUTOMATIC SELECTION |
| | ⋮ | ⋮ |
| | DELETE DESIGNATION | YES |

PRINTER AND NETWORK PRINTING SYSTEM

BACKGROUND OF THE INVENTION

1. Field of the Invention

The present invention relates to a printer and a network printing system.

The present application is based on Japanese Patent Applications No. Hei. 11-11612 and 11-230119, which are incorporated herein by reference.

2. Description of the Related Art

A network printing system is well known wherein a network printer is used in common by a plurality of host computers. In one example of such a well known network printing system, either one computer is employed as a print server, or a print server is included as an integral part of a printer and print data are collected by the print server.

In order to manage print jobs in a conventional network printing system, a special client software program must be installed in a client computer, or a connection between a print server and a client computer must be implemented by employing a special communication protocol.

When a client software program has been installed in each computer in a system, every time the software program is improved the copies of the program held by all of the individual computers must be upgraded. Therefore, a great deal of human labor is involved, and the software management and the client computer environment maintenance costs are increased. For these reasons, a method, represented by a Java program developed by Sun Microsystems, Inc. (Java is a trademark of Sun Microsystems, Inc.), has recently been proposed whereby an architecturally-neutral program that is transmitted to a client computer by a server is activated by the client computer. In this case, however, a virtual machine to translate and execute the program received from the server must previously have been mounted in the client computer. In addition, since the class libraries available to the virtual machines in the various client computers may differ, the capabilities of all of the client computers can not always be fully demonstrated. Furthermore, since a special protocol is employed to connect the server and the individual client computers, a great deal of human effort is required for the development and the improvement of the print job management software and the protocol, and the general purpose usability of the method is low.

SUMMARY OF THE INVENTION

It is, therefore, one objective of the present invention to provide, for the management of print jobs, a printer and a network printing system that employ a comparatively simple configuration. It is another objective of the present invention to provide, for the management of print jobs, a printer and a network printing system that can use a general-purpose file transfer protocol.

To achieve the above objectives, the present invention is specified as follows. A printer, which is connected to a computer via a network, comprises:

transfer means, for exchanging information with the computer via the network;

storage means, for storing a document file to be printed that is received from the computer via the transfer means;

configuration file generation means, for employing print setup information in the document file, which is received from the computer via the transfer means, to generate a configuration file concerning a print setup for the document file;

print setup reference means, for employing the configuration file to generate a menu indicating the contents of the print setup, and for transmitting the menu via the transfer means to the computer; and printing means, for, in accordance with the configuration file, printing the document file that is stored in the storage means.

Specifically, the print setup for the printer is not performed in advance, but a configuration file is generated based on print setup information that is designated by the computer. If the print setup designated by the computer does not match the function of the printer, or if all the print setup information required for printing is not designated, an initial value set in advance for the printer can be designated. A user can refer to the menu and confirm the contents of the print setup. A document file that is waiting to be printed can also be displayed on the menu.

The printer further comprises: setup change means, for, when the computer operates the menu via the transfer means, updating the contents of the configuration file in accordance with the operation.

Specifically, the menu includes upper directories that are generated for individual entries in the print setup, and lower directories that are generated for individual setup values, one of which is included in each of the entries. The menu can be formed by correlating visual display elements corresponding to the document file with the lower directories.

The visual display element is an element, such as an icon, with which a document file is visually displayed. The setup value can be changed, for example, by moving the visual display element of the document file from one lower directory to another lower directory.

Furthermore, to achieve the above objectives, a method for controlling a printer, which is connected to a computer via a network, comprises the steps of:

receiving, from the computer via the network, a document file to be printed and print setup information for the document file;

storing the document file;

employing the print setup information to generate a configuration file concerning a print setup for the document file;

employing the configuration file to generate a menu that listing the contents of the print setup, and transmitting the menu to the computer; and printing the document file in accordance with the configuration file.

Further, according to the present invention, provided is a computer-readable recording medium on which a control program is stored for a printer that is connected to a computer via a network, the program permitting the computer of the printer to perform:

a transfer function, for exchanging information with the computer via the network;

a storage function, for storing, to a storage device, a document file to be printed that is received from the computer;

a configuration file generation function, for employing print setup information in the document file, which is received from the computer, to generate a configuration file concerning a print setup for the document file;

a print setup reference function, for employing the configuration file to generate a menu indicating the contents of the print setup, and for transmitting the menu to the computer; and a printing function, for, in accordance with the configuration file, printing the document file that is stored in the storage device. Various recording mediums can be employed, such as a memory, a CD-ROM, a CD-RAM, a DVD-ROM, a DVD-RAM, a floppy disk, a hard disk, a magneto-optical disk or magnetic tape. In addition, a communication medium can be employed, and a predetermined program may be downloaded via a communication line.

The present invention can be implemented as a network printing system. Specifically, a network printing system comprises:

a host computer for generating and transmitting print data; and a printer that is connected via a network to the host computer, wherein the host computer includes user interface means for providing information for a user and for accepting instructions from the user, print data generation means for converting, into print data, a file that is designated via the user interface means, and communication means for communicating with the printer, and wherein the printer includes transfer means for exchanging information with the host computer via the network, storage means for storing the print data received from the host computer via the transfer means, configuration file generation means for employing print setup information for the print data, which are received from the host computer via the transfer means, to generate a configuration file concerning a print setup for the print data, print setup reference means for employing the configuration file to generate a menu listing the contents of the print setup, and for transmitting the menu via the transfer means to the user interface means, and print means for printing, in accordance with the configuration file, the print data stored in the storage means.

When the host computer moves the print data included in the menu to a different printer via the user interface means, the first printer to receive the print data may transmit to the different printer the print data stored in the storage means.

There is a case where print data are transmitted to a second desired printer because a first desired printer is in use, but before the printing is started by the second desired printer, the first desired printer becomes ready for use. There is also a case where a user selects an incorrect printer. In these cases, the user issues an instruction to shift print data to another printer via the user interface means. In accordance with this instruction, the printer that is selected first transmits the print data to a newly selected printer. Therefore, since the user neither has to cancel the print data that have already been registered in the old printer nor has to transmit the print data to the new printer, usability is improved.

Further, to achieve the above objectives, according to the present invention a network printing system comprises:

a computer that has an FTP (File Transfer Protocol) client for, in accordance with the FTP, transmitting a document file to be printed; and a printer that is connected to the computer via a network and that has an FTP file server, which includes storage means for storing the document file that is received, configuration file generation means for employing print setup information in the document file and an initial value that is set in advance to generate a configuration file concerning a print setup for the document file, print setup reference means for employing the configuration file to generate a menu that lists the contents of the print setup, and for transmitting the menu to the computer, and setup change means for, when the menu is operated by the computer, updating the contents of the configuration file in accordance with the operation, wherein the document file stored in the storage means is printed in accordance with the configuration file.

Since the FTP, which is the standard file transfer protocol, is employed and no special software or protocol is required, a document file can be transferred from the FTP client of the computer to the FTP server for the printer, or the document file can be shifted to the FTP server of another printer or can be deleted. In addition, the contents of the print setup can be confirmed only by referring to the menu, and the print setup can be changed only by operating the menu.

Features and advantages of the invention will be evident from the following detailed description of the preferred embodiments described in conjunction with the attached drawings.

BRIEF DESCRIPTION OF THE DRAWINGS

In the accompanying drawings:

FIGS. 2A and 2B shows diagrams for explaining the structure of print data, with FIG. 2A showing the structure of print data, and FIG. 2B showing the structure of a configuration file;

DETAILED DESCRIPTION OF THE PREFERRED EMBODIMENTS

The preferred embodiment of the present invention will now be described while referring to FIGS. 1 to 9. In a printer and a network printing system according to the present invention, predetermined functions of the present invention are carried out when a CPU executes a program. Therefore, a printer and a computer system according to the present invention are functionally represented, and will be described by using a functional block diagram for a function implementing means.

Figure 1:
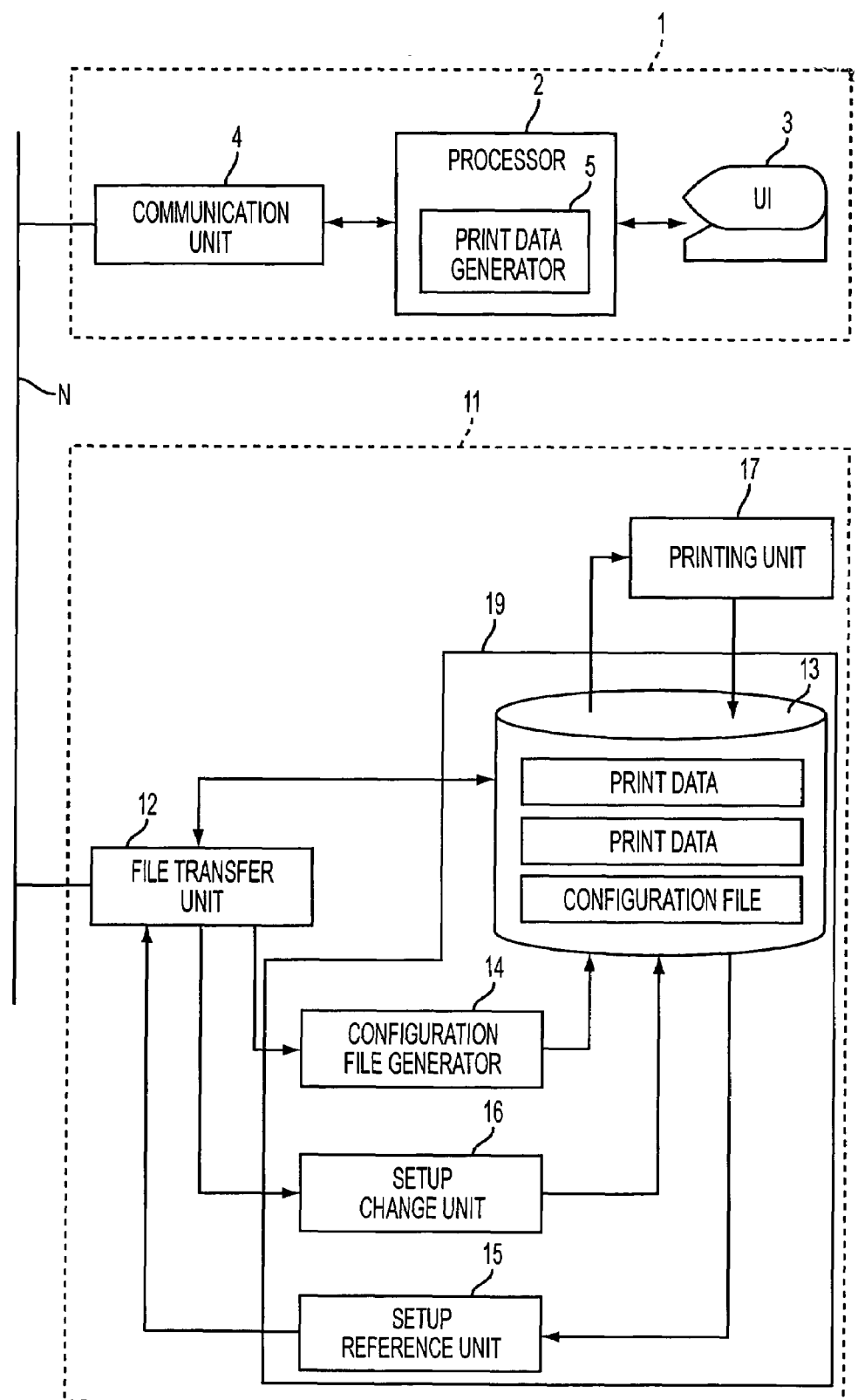
FIG. 1 shows a block diagram illustrating the functional arrangement of a network printing system according to one embodiment of the present invention.

FIG. 1 is a functional block diagram for a network printing system.

A computer 1 comprises: a processor 2, including a CPU, a memory or the like; a user interface (UI) 3, for providing a variety of information for a user and for accepting instructions from the user; and a communication unit 4, for communicating with a printer 11 in accordance with an FTP protocol. The processor 2 also includes a print data generator 5 for generating print data, based on a document file to be printed, that the printer 11 can translate. The computer 1 has an FTP client, and generally employs the FTP protocol to exchange information with the printer 11.

The printer 11, as will be explained later, comprises a file transfer unit 12, a storage unit 13, a configuration file generator 14, a setup reference unit 15, a setup change unit 16 and a printing unit 17. The file transfer unit (hereinafter also referred to simply as a "transfer unit") 12 that serves as transfer means is so designed that file transfers can at least be performed in accordance with the FTP protocol. The transfer unit 12 received print data from the computer and stores them in the storage unit 13 that serves as "storage means." The storage unit 13 can be, for example, a hard disk, a memory or the like. Further, the storage unit 13, configuration file generator 14, setup reference unit 15, and setup change unit 16 can constitute a file transfer protocol file server 19.

The configuration file generator 14 that serves as "configuration file generation means" employs print setup information (print attributes) received with the print data to generate a configuration file for each document file, i.e., for each print job, and stores the configuration file in the storage unit 13. As is shown in FIG. 2A, data transmitted by the computer 1 is composed of print setup information storage areas 21A to 21B (hereinafter also referred to collectively as a "print setup information storage area 21") (i.e. 21A to 21N), in which print setup information, such as a "printer name," 21A, a "priority" 21B, and a "paper discharge method," 21C are stored, and a print data storage area 22, in which are stored print data for a document to be printed.

The entry "printer name" 21A is used to designate a printer to be used for printing. The entry "priority" 21B is used to designate the printing order, and one level, such as "highest priority", "normal" or "low priority," can be selected. The entry "paper discharge method" 21C is used to designate a paper discharge destination, and as a setup-value, one destination, such as a "face-up tray" or a "face-down tray." The entry "paper supply method" is used to designate a paper supply source, and one source, such as "tray 1," "tray 2" or "automatic selection," can be selected. The entry "delete designation" 21N is used to convey an instruction to delete or to not delete from the storage unit 13 print data that have been printed. Once instruction, such as "delete (delete data after printing)" or "do not delete (save data)," can be selected. The above entries and set values are merely examples, and the present invention is not limited to them. For example, another setup value, such as "delete after a predetermined time elapses," can be added to the entry "delete designation." Further, not all the above entries and setup values need be prepared.

The print data in the print data storage area 22 are stored in the storage unit 13, and a variety of print setup information in the print setup information storage area 21 is translated by the configuration file generator 14. The configuration file generator 14 can generate a configuration file as is shown in FIG. 2B. That is, for each print job, a configuration file is generated in which setup values are stored for the individual entries. It should be noted that one configuration file for the individual print jobs is shown in FIG. 2B, but actually a configuration file is generated for each print job (hereinafter, print data J1 to J3 may be called print jobs J1 to J3).

The computer 1 need not designate a set value for all the selectable entries in advance. The computer 1 can, for example, designate a value only for the "priority," or can transmit only print data without designating any print setup. The configuration file generator 14 provides an initial value for the entries for which no value is designated by the computer 1. When, for example, print data that does not include a value for "priority" is received, the configuration file generator 14 sets "normal" as the initial value for "priority." Therefore, before transmission of print data, the computer 1 does not have to know which entries have been selected for the printer.

The setup reference unit 15, which serves as "print setup reference means," employs the contents of the configuration file to generate a menu having a tree structure, which will be described later while referring to FIG. 3. The setup change means 16, which serves as "setup change means," reflects, to the configuration file, the menu operation performed by the user.

Figure 3:
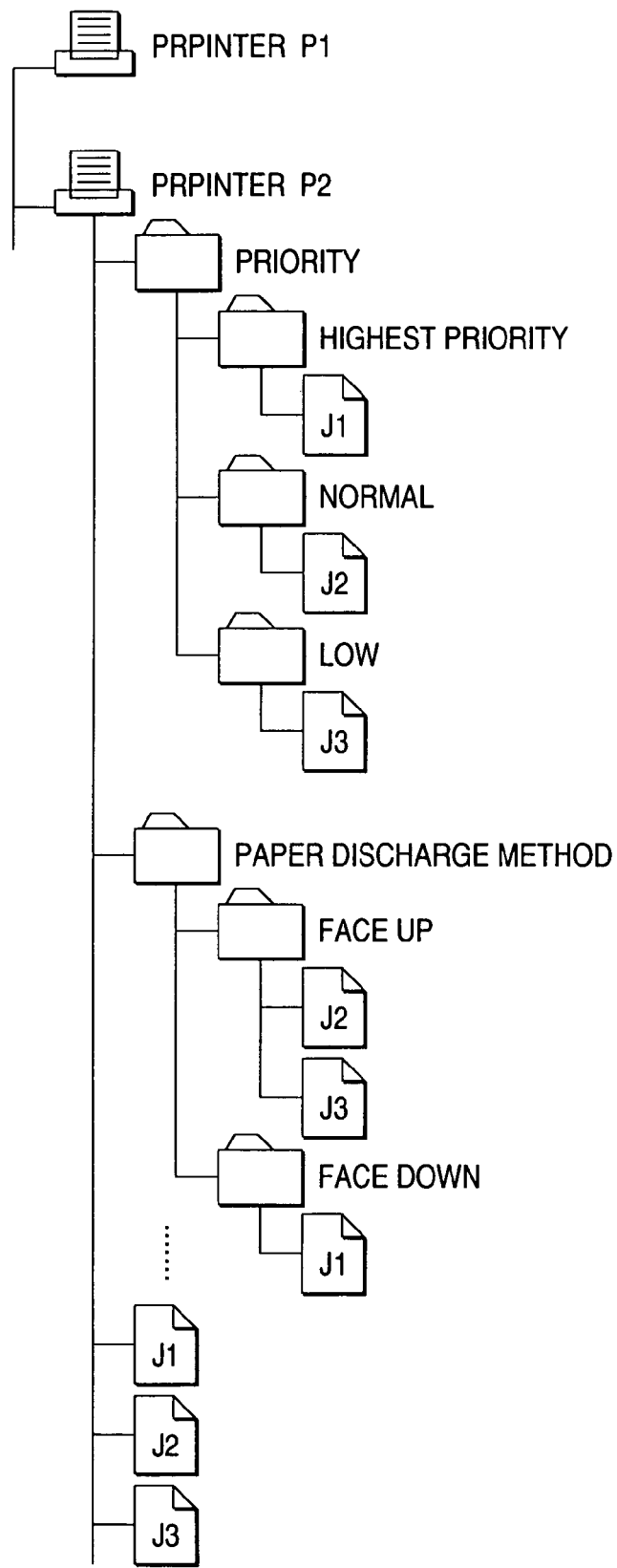
FIG. 3 shows a diagram for explaining the schematic structure of a menu.

FIG. 3 is a schematic diagram for explaining the structure of a menu that is provided for a user via the user interface 3. In FIG. 3, a plurality of printers, P1 and P2, are shown, of which, at the least, the printer P2 is a network printer according to this embodiment.

Below the printer P2, provided are directories having individual titles, such as "priority" and "paper discharge method," and other directories for print data J1 to J3. That is, it would appear to a user that the individually titled directories and the directories for the stored print data are provided as parts of the root directory for the storage unit 13. It should be noted that for convenience sake the entries for only some directories are shown in FIG. 3.

Below individual setup value directories entered for each of the individually titled directories, job icons are provided that correspond to print data for which the pertinent setup values are designated. For example, shown below the "highest priority" directory is job icon "J1," which corresponds to the print data J1 for which the highest printing priority is designated. In addition, shown below the "face up" directory are job icons "J2" and "J3," which correspond to the print data J2 and J3 for which a face-up tray is designated as a paper discharge destination.

Figure 4:
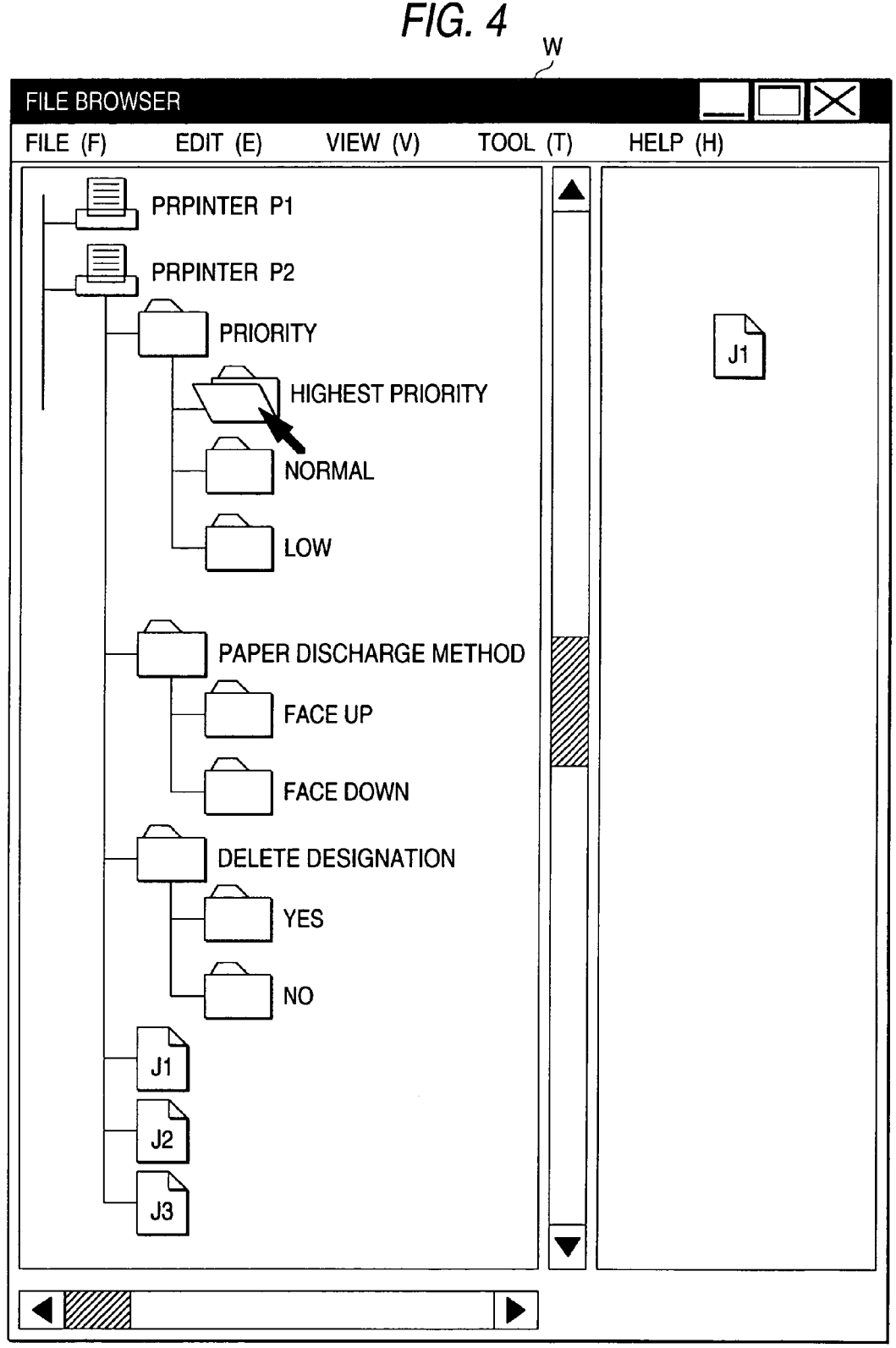
FIG. 4 shows a diagram for explaining an example operating screen.

FIG. 4 is a diagram for explaining a display provided via a file browser W. As is shown in FIG. 4, a user can employ the menu provided by the setup reference unit 15 to refer to the print setup for the print data. Further, the user can change the print setup by moving a job icon to a desired setup value directory. The setup change unit 16 updates the original configuration file by rewriting it in accordance with the shifting of the job icon.

Figure 5:
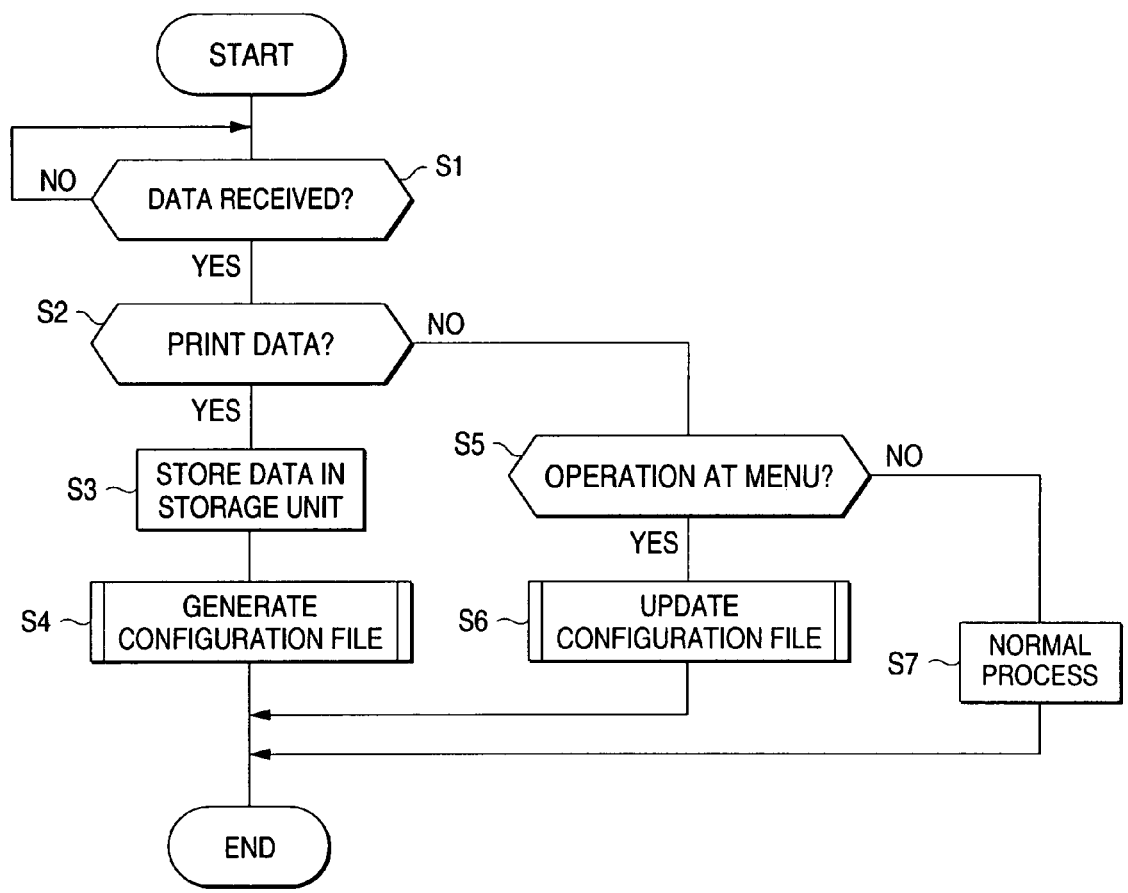
FIG. 5 shows a flowchart showing the overall processing performed by a printer.

The processing performed for this embodiment will now be described. FIG. 5 is a specific flowchart showing the overall operation performed by the printer. First, a check is performed to determine whether data or a command (hereinafter these two are not specifically distinguished between and are referred to simply as data) has been received from the computer 1 (S1). When data have been received (YES at S1), a check is performed to determine whether the data are print data, i.e., whether a print job has been received (S2).

When print data have been received (YES at S2), the print data are stored in the storage unit 13 (S3). Then, a configuration file is generated based on information stored in the print setup information storage area 21 (S4).

If the received data are not print data (NO at S2), a check is performed to determine whether manipulation of the menu in FIGS. 3 and 4 has occurred (S5). If manipulation of the menu has occurred (YES at S5), the configuration file is updated in accordance with the contents of the operation (S6). If manipulation of the menu has not occurred (NO at S5), the normal process is performed (S7). During the normal process, a reply can be issued, for example, for a status request command for the remaining amount of toner or paper.

Figure 6:
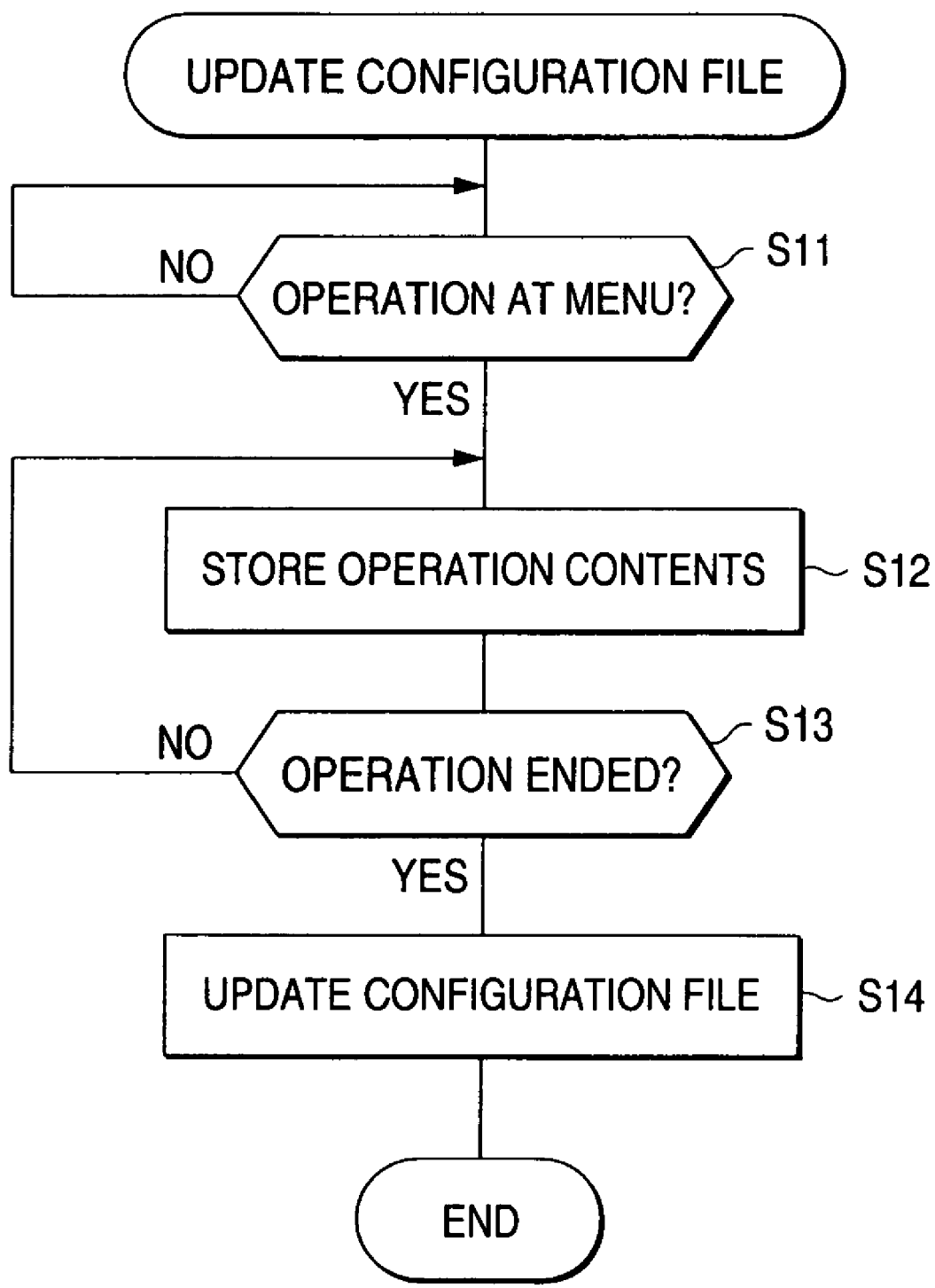
FIG. 6 shows a flowchart showing the processing performed to update a configuration file in accordance with an operation performed at a menu.

FIG. 6 is a flowchart showing the configuration file updating process at S6 in FIG. 5. First, a check is performed to determine whether the user has manipulated a job icon (S11). When an operation has occurred at the menu (YES at S11), the contents of the operation are stored (S12). The process at S12 is repeated so long as the operation at the menu has not been terminated (NO at S13). When the user terminates the operation (YES at S13), the original configuration is updated by rewriting it based on the contents of the operation that have been stored (S14).

Figure 7:
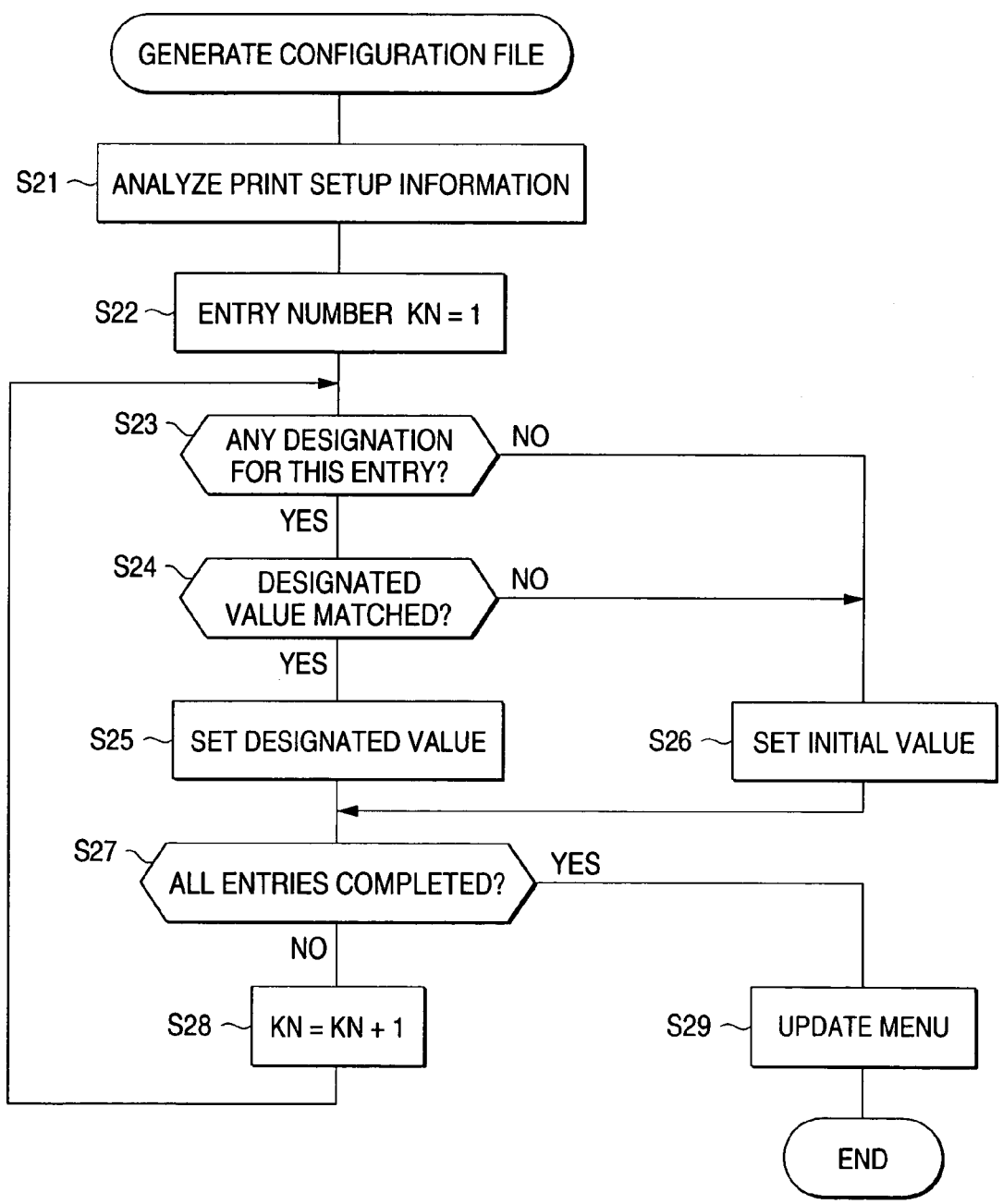
FIG. 7 shows a flowchart showing the processing performed to generate a configuration file.

FIG. 7 is a flowchart showing the configuration file generation process at S4 in FIG. 5. First, the print setup information stored in the print setup information storage area 21 is analyzed (S21), and the value of entry number KN, which is used to arrange the print setup entries in order, is set to 1 (S22). That is, a check is performed to determine whether a set value has been designated for the pertinent entry (S23). When a set value has been designated by the computer 1 (YES at S23), a check is performed to determine whether the designated value matches the specifications for the printer, i.e., whether a selectable value has been designated (S24). If the designated value matches the specifications (YES S24), this value is set (S25). When no set value has been designated (NO at S23), or when the designated value does not match the specifications (NO at S24), an initial value that has been defined in advance is set (S26). That is, if, for printing, the computer 1 designates the value for "highest priority," this value is set. When the computer 1 does not designate any value or designates an incorrect value, the initial value for "normal" is set.

A check is then performed to determine whether a value has been set for all the entries (S27). If there is still an entry, or entries, for which a value has not been set (NO at S27), the entry number KN is incremented by one, and program control returns to S23 (S28). If a value has been set for all the entries (YES at S27), the configuration file is completed and the menu is updated (S29).

Figure 8:
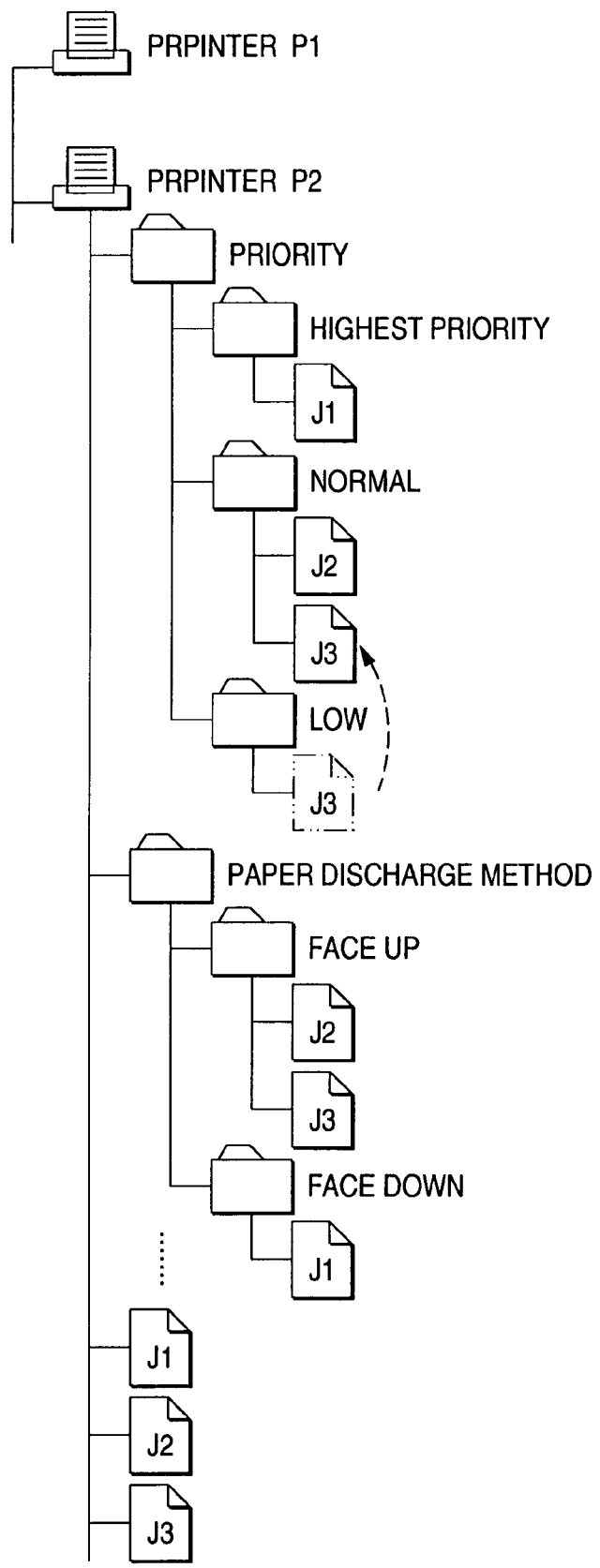
FIG. 8 shows a diagram for explaining the state wherein a print setup is changed by moving a job icon.

In the thus arranged embodiment, an OS standard file browser can be employed to easily refer to or to change a print setup, and the operability and the usability are increased. FIG. 8 is a diagram for explaining the print setup process. When, for example, a user desires assign a higher printing priority to the print data J3, the user moves job icon "J3" from its position below the setup value directory "low" to a position below the setup value directory "normal." Thus, the configuration file for print data J3 is rewritten, and its position in the printing order is raised.

Figure 9:
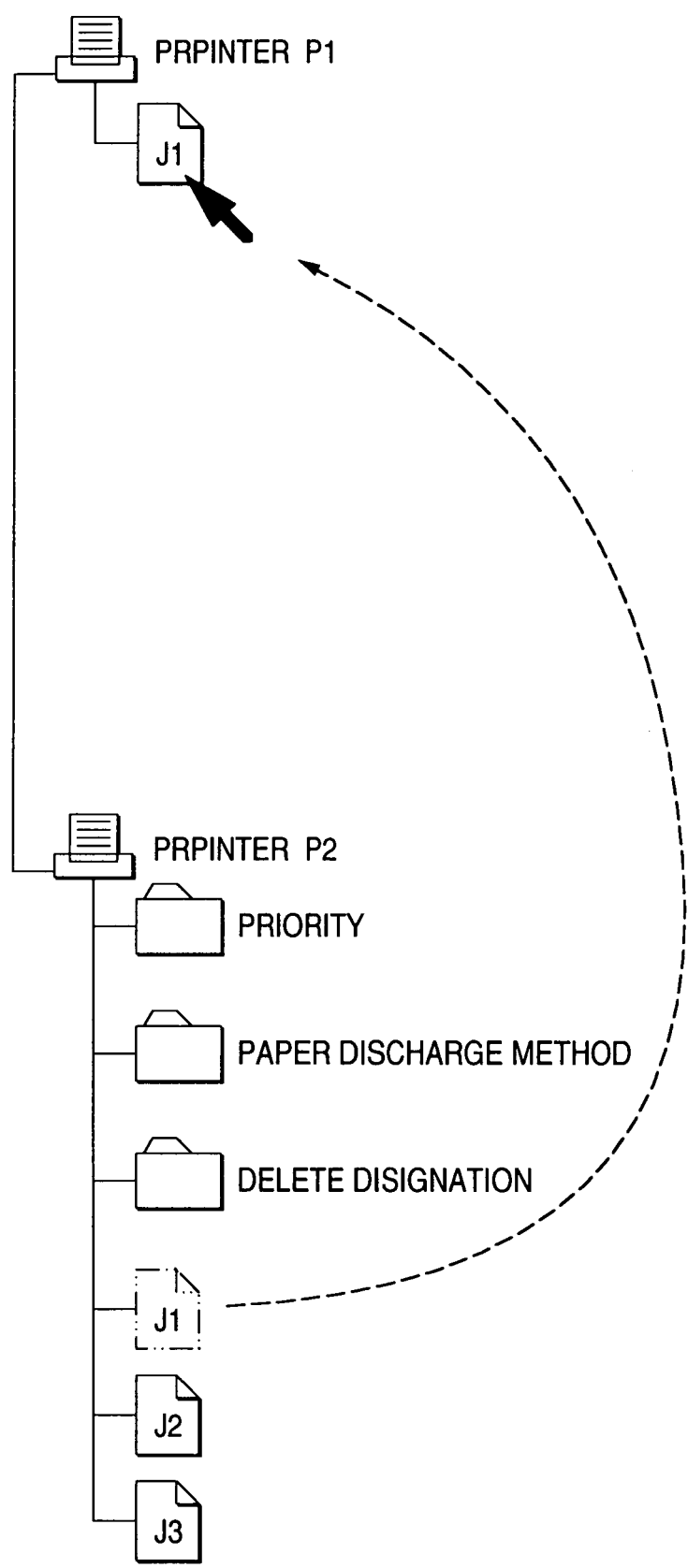
FIG. 9 shows a a diagram for explaining the state wherein a print job is moved to another printer.

As is shown in FIG. 9, via a file browser, the user can move to another printer P1 the print data J1 stored in printer P2. Therefore, a process by which the print data J1 at printer P2 is deleted and by which the print data J1 is transmitted to the printer P1 by the computer 1 is not required.

Figure 10:
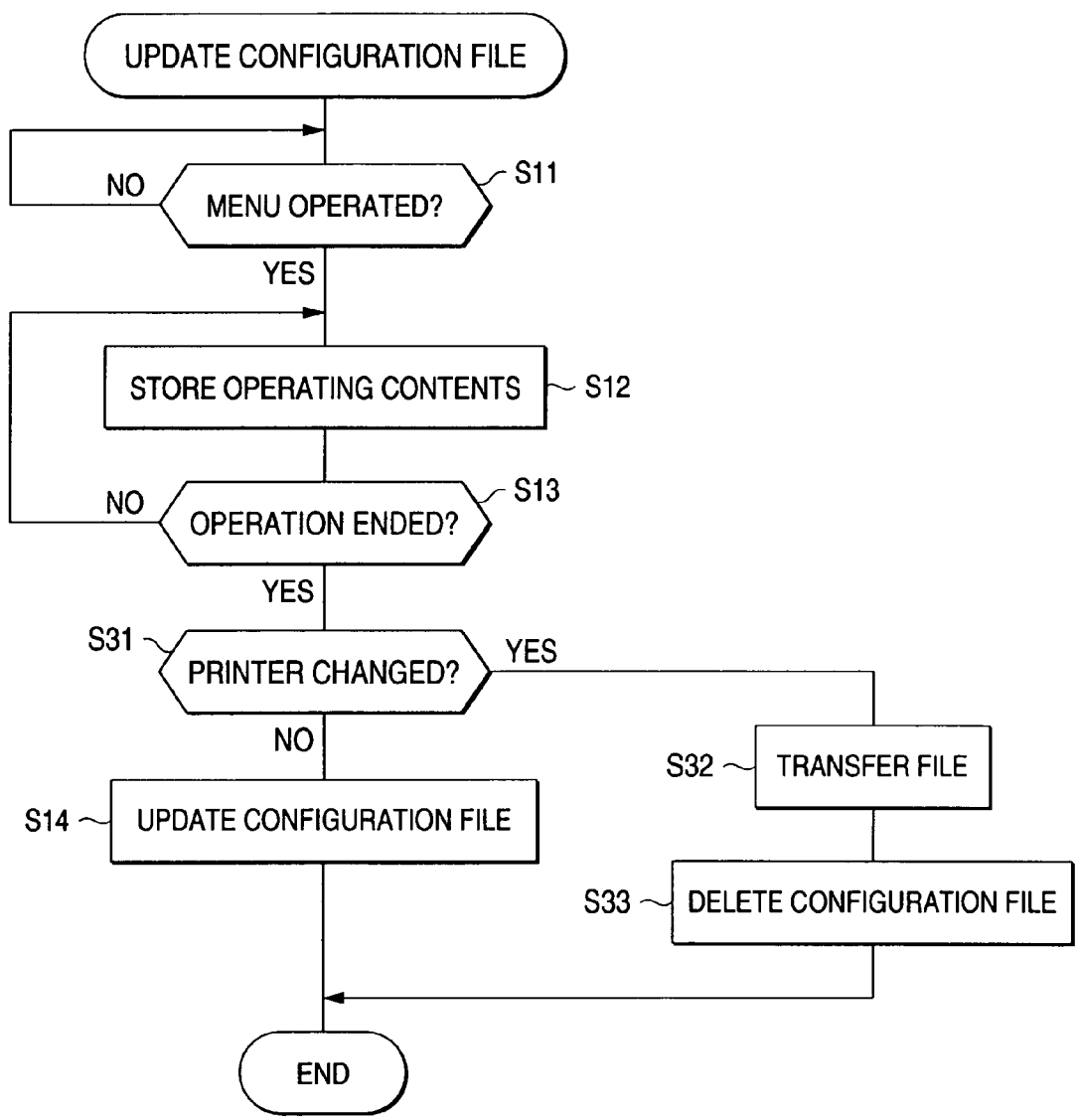
FIG. 10 shows a flowchart showing the processing performed to move a print job to another printer.

FIG. 10 is a flowchart showing the processing for moving print data from one printer to another printer. When the user has completed the operation at the menu (YES at S13), a check is performed to determine whether there has been a printer change (S31). When there has been a printer change (YES at S31), a print data file is transmitted to a newly selected printer (S32), and a configuration file stored at the old printer is deleted (S33). The configuration file may also be transmitted with the print data.

Since especially in this embodiment data are exchanged by the FTP client of the computer 1 and the FTP server of the printer, only one protocol is required to manage the jobs for the printer. It should be noted that the file transfer protocol is not limited to the FTP, and depending on the case, another file transfer protocol, such as MFTP (Multicast File Transfer Protocol), may be employed.

As is described above, according to the present invention, a configuration file is generated based on print setup information received from the computer, and a menu, based on the configuration file, that includes the print setup can be provided for a user. Therefore, only a simple operation is required to change the contents of the print setup, and the management process for a print job can performed easily.

In addition, since the FTP is employed for file transfers between the FTP server of the printer and the FTP client of the computer, a special software program or a special protocol is not required, and a widely applicable general-purpose system can be constructed.

The embodiments of the present invention are described above, however, these embodiments are examples for explaining the present invention and the present invention is not limited to only these embodiments. Therefore, the present invention can be also embodied in various embodiments other than the above embodiments.

What is claimed is:

1. A printer, which is connected to a computer via a network, comprising:
    transfer means for exchanging information with said computer via said network;
    storage means for storing a document file to be printed that is received from said computer via said transfer means;
    configuration file generation means for employing print setup information in said document file, which is received from said computer via said transfer means, to generate a configuration file concerning a print setup for said document file;
    print setup reference means for employing said configuration file to generate a menu indicating contents of said print setup, and for transmitting said menu via said transfer means to said computer;
    printing means for printing said document file that is stored in said storage means in accordance with said configuration file; and
    setup change means for, when said computer operates said menu via said transfer means, updating contents of said print setup in accordance with the operation,
    wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

2. A printer according to claim 1, wherein, when said computer operates said menu via said transfer means, said setup change means updates contents of said configuration file in accordance with the operation.

3. A method for controlling a printer, which is connected to a computer via a network, comprising steps of:
   receiving, from said computer via said network, a document file to be printed and print setup information for said document file;
   storing said document file in said printer;
   employing said print setup information to generate, in said printer, a configuration file concerning a print setup for said document file;
   employing said configuration file to generate, in said printer, a menu that listing contents of said print setup, and transmitting said menu to said computer; and
   printing said document file in accordance with said configuration file,
   wherein, when said computer operates said menu, contents of said print setup are updated in accordance with the operation, and
   wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

4. A computer-readable recording medium on which a control program is stored for a printer that is connected to a computer via a network, said program permitting said printer to perform:
   a transfer function for exchanging information with said computer via said network;
   a storage function for storing to a storage device in said printer, a document file to be printed that is received from said computer;
   a configuration file generation function, for employing print setup information in said document file, which is received from said computer, to generate, in said printer, a configuration file concerning a print setup for said document file;
   a print setup reference function, for employing said configuration file to generate, in said printer, a menu indicating contents of said print setup, and for transmitting said menu from said printer to said computer;
   a setup change function for, when said computer operates said menu via said transfer function, updating contents of said print setup; and
   a printing function for printing said document file that is stored in said storage device in accordance with said configuration file,
   wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

5. A recording medium according to claim 4, wherein, when said computer operates said menu, said setup change function updates the contents of said configuration file in accordance with the operation.

6. A network printing system comprising:
   a host computer for generating and transmitting print data; and
   a printer that is connected via a network to said host computer, said host computer comprising:
   user interface means for providing information for a user and for accepting instructions from said user;
   print data generation means for converting, into print data, a file that is designated via said user interface means; and
   communication means for communicating with said printer; and
   said printer comprising:
   transfer means for exchanging information with said host computer via said network;
   storage means for storing said print data received from said host computer via said transfer means;
   configuration file generation means for employing print setup information for said print data, which are received from said host computer via said transfer means, to generate a configuration file concerning a print setup for said print data;
   print setup reference means for employing said configuration file to generate a menu listing the contents of said print setup, and for transmitting said menu via said transfer means to said user interface means;
   setup change means for, when said computer operates said menu via said transfer means, updating contents of said print setup; and
   print means for printing, in accordance with said configuration file, said print data stored in said storage means,
   wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

7. A network printing system according to claim 6, wherein, when said computer operates said menu via said transfer means, said setup change means updates the contents of said configuration file in accordance with the operation.

8. A network printing system according to claim 7, wherein, when said host computer moves said print data included in said menu to a different printer via said user interface means, said printer transmits said print data stored in said storage means directly to said different printer.

9. A network printing system comprising:
   a computer having a file transfer protocol client for transmitting a document file to be printed in accordance with a file transfer protocol; and
   a printer being connected to said computer via a network and having a file transfer protocol file server, said file transfer protocol file server comprising:
   storage means for storing said document file that is received;
   configuration file generation means for employing print setup information in said document file and an initial value that is set in advance to generate a configuration file concerning a print setup for said document file;
   print setup reference means for employing said configuration file to generate a menu that lists the contents of said print setup, and for transmitting said menu to said computer; and
   setup change means for, when said menu is operated by said computer, updating the contents of said print setup in accordance with an operation,
   wherein said document file stored in said storage means is printed in accordance with said configuration file, and
   wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

10. A printer, which is connected to a computer via a network, comprising:
a file transfer unit that exchanges information with said computer via said network;
a storage unit that stores a document file to be printed that is received from said computer via said file transfer unit;
a configuration file generator that employs print setup information in said document file, which is received from said computer via said file transfer unit, to generate a configuration file concerning a print setup for said document file;
a print setup reference unit that employs said configuration file to generate a menu indicating contents of said print setup, and for transmitting said menu via said file transfer unit to said computer;
a setup change unit that updates contents of said print setup when said computer operates said menu via said file transfer unit, and
a printing unit that prints said document file that is stored in said storage unit in accordance with said configuration files,
wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

11. A network printing system comprising:
a host computer for generating and transmitting print data; and
a printer that is connected via a network to said host computer,
said host computer comprising:
a user interface that provides information to a user and for accepting instructions from said user;
a print data generator that converts, into print data, a file that is designated via said user interface; and
a communication unit that communicates with said printer; and
said printer comprising:
a file transfer unit that exchanges information with said host computer via said network;
a storage unit that stores said print data received from said host computer, as a document file, via said file transfer unit;
a configuration file generator that employs print setup information in said document file, which are received from said host computer via said file transfer unit, to generate a configuration file concerning a print setup for said document file;
a print setup reference unit that employs said configuration file to generate a menu listing the contents of said print setup, and for transmitting said menu via said file transfer unit to said user interface;
a setup change unit that updates contents of said print setup when said computer operates said menu via said file transfer unit, and
a printing unit that prints, in accordance with said configuration file, said document file stored in said storage unit,
wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

12. A network printing system comprising:
a computer having a file transfer protocol client for transmitting a document file to be printed in accordance with a file transfer protocol; and
a printer being connected to said computer via a network and having a file transfer protocol file server, said file transfer protocol file server comprising:
a storage unit that stores said document file that is received;
a configuration file generator that employs print setup information in said document file and an initial value that is set in advance to generate a configuration file concerning a print setup for said document file;
a print setup reference unit that employs said configuration file to generate a menu that lists the contents of said print setup, and for transmitting said menu to said computer; and
a setup change unit that, when said menu is operated by said computer, updates the contents of said print setup in accordance with an operation,
wherein said document file stored in said storage unit is printed in accordance with said configuration file, and
wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

13. A printer, which is connected to a computer via a network, comprising:
a file transfer unit that exchanges information with said computer via said network;
a storage unit that stores a document file to be printed that is received from said computer via said file transfer unit; and
a controller,
wherein said controller employs print setup information in a document file, which is received from said computer via said file transfer unit, to generate a configuration file concerning a print setup for said document file;
wherein said controller employs said configuration file to generate a menu indicating contents of said print setup information, and transmits said menu via said file transfer unit to said computer,
wherein said controller updates contents of said print setup when said computer operates said menu via said file transfer unit,
wherein said controller controls printing of said document file, that is stored in said storage unit, in accordance with said configuration file, and
wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

14. A network printing system comprising:
a host computer for generating and transmitting print data; and
a printer that is connected via a network to said host computer,
said host computer comprising:
a user interface that provides information to a user and for accepting instructions from said user;
a print data generator that converts, into print data, a file that is designated via said user interface; and
a communication unit that communicates with said printer; and
said printer comprising:
a file transfer unit that exchanges information with said host computer via said network;
a storage unit that stores said print data received from said host computer, as a document file, via said file transfer unit; and
a controller,
wherein said controller employs print setup information in said document file, which are received from said host computer via said file transfer unit, to generate a configuration file concerning a print setup for said document file,
wherein said controller employs said configuration file to generate a menu listing the contents of said print setup, and transmits said menu via said file transfer unit to said user interface,
wherein said controller updates contents of said print setup when said computer operates said menu via said file transfer unit,
wherein said controller controls printing, in accordance with said configuration file, of said document file stored in said storage unit, and
wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

15. A network printing system comprising:
a computer having a file transfer protocol client for transmitting a document file to be printed in accordance with a file transfer protocol; and
a printer being connected to said computer via a network and having a file transfer protocol file server, said file transfer protocol file server comprising:
a storage unit that stores said document file that is received; and
a controller,
wherein said controller employs print setup information in said document file and an initial value that is set in advance, to generate a configuration file concerning a print setup for said document file;
wherein said controller employs said configuration file to generate a menu that lists the contents of said print setup, and transmits said menu to said computer;
wherein said controller updates the contents of said print setup in accordance with an operation when said menu is operated by said computer,
wherein said document file stored in said storage unit is printed in accordance with said configuration file, and
wherein said menu includes upper directories that are generated for individual entries in said print setup, and lower directories that are generated for individual setup values, one of which is included in each of said entries, and wherein said menu is formed by correlating visual display elements corresponding to said document file with said lower directories.

16. The printer according to claim 1, wherein at least one of said individual entries corresponds to at least one printer.

17. The recording medium according to claim 5, wherein at least one of said individual entries corresponds to at least one printer.

* * * * *